United States Patent [19]

Halter

[11] 4,035,590
[45] July 12, 1977

[54] APPARATUS FOR ELECTROMECHANICAL RECORDING OF SHORT WAVELENGTH MODULATION IN A METAL MASTER

[75] Inventor: Jerome Barth Halter, Indianapolis, Ind.

[73] Assignee: RCA Corporation, New York, N.Y.

[21] Appl. No.: 668,981

[22] Filed: Mar. 22, 1976

Related U.S. Application Data

[62] Division of Ser. No. 591,968, June 30, 1975.

[51] Int. Cl.² ............... H04R 17/04; H01V 7/00
[52] U.S. Cl. ............... 179/100.41 P; 358/128; 179/100.4 C
[58] Field of Search ............... 178/6.6 B, 6.6 R; 179/100.4 C, 100.41 P; 274/46 R

[56] References Cited
U.S. PATENT DOCUMENTS

| | | | |
|---|---|---|---|
| 3,582,549 | 7/1971 | Hell | 178/6.6 B |
| 3,805,100 | 4/1974 | Klemp | 274/46 R |
| 3,824,352 | 7/1974 | Adler | 179/100.4 C |
| 3,835,362 | 9/1974 | Moritz | 179/100.4 C |
| 3,837,656 | 9/1974 | Praderuand | 179/100.4 C |
| 3,865,997 | 2/1975 | Halter | 179/100.41 P |
| 3,911,476 | 10/1975 | Kaiser | 178/6.6 R |
| 3,946,149 | 3/1976 | White | 179/100.41 P |

Primary Examiner—Jay P. Lucas
Attorney, Agent, or Firm—Eugene M. Whitacre; William H. Meagher; Dilip A. Kulkarni

[57] ABSTRACT

An unheated cutting stylus is positioned with respect to a metal master in order to cut a groove having a quiescent groove depth less than one micrometer while relative motion is established between the cutting stylus and the metal master. The cutting stylus is vibrated about the quiescent position thereof in response to a relatively high frequency signal while cutting the groove in order to cut an information track comprising short wavelength modulation (e.g., 0.6 to 1.6 micrometers) of groove depth in the bottom of the groove having a peak-to-peak dimension less than the quiescent groove depth. The cutting stylus vibration is effected by a piezoelectric element which is mounted directly between a pedestal and the cutting stylus by means of bonding materials. The pedestal, the piezoelectric element, and the cutting stylus are shaped to form a cutterhead structure having all external surfaces disposed in anti-parallel relationship to each other.

11 Claims, 15 Drawing Figures

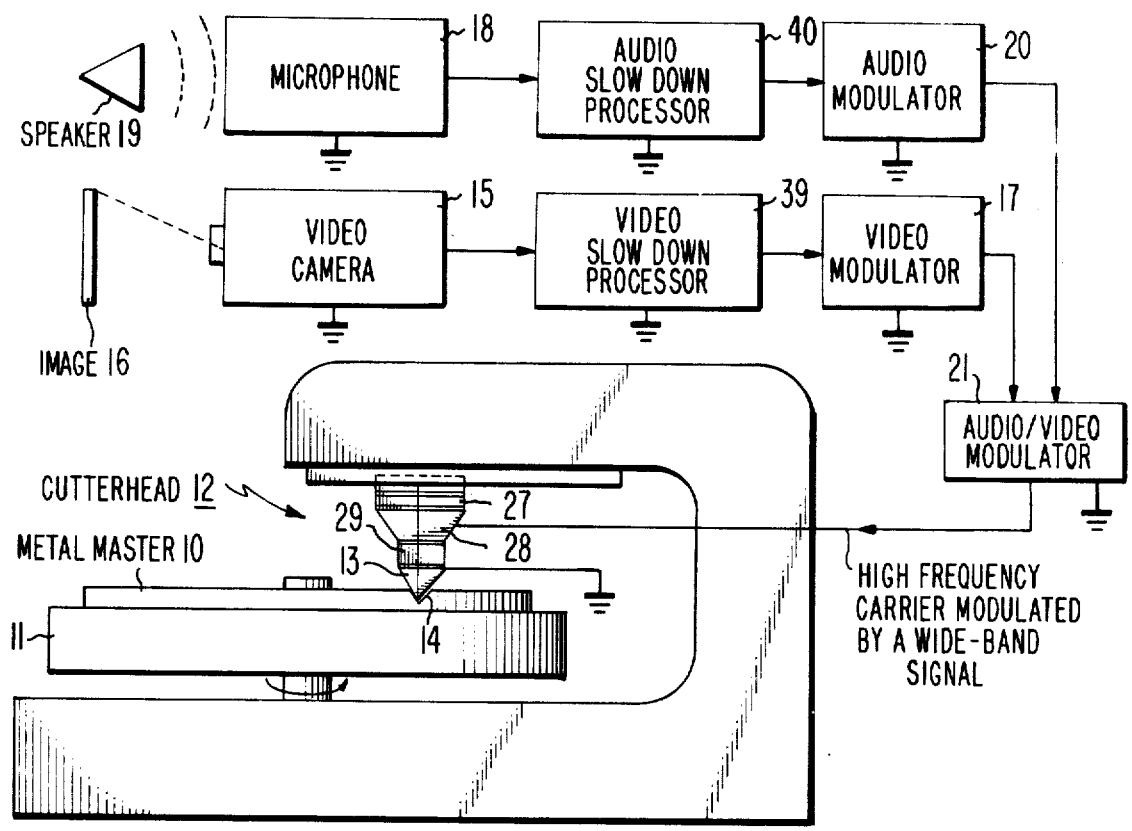
Fig. 1
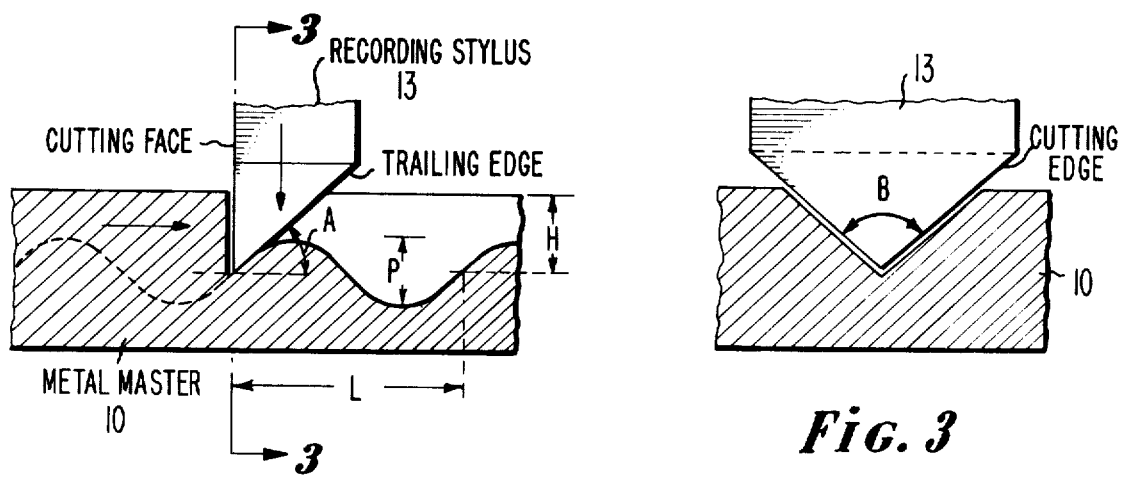
Fig. 2
Fig. 3

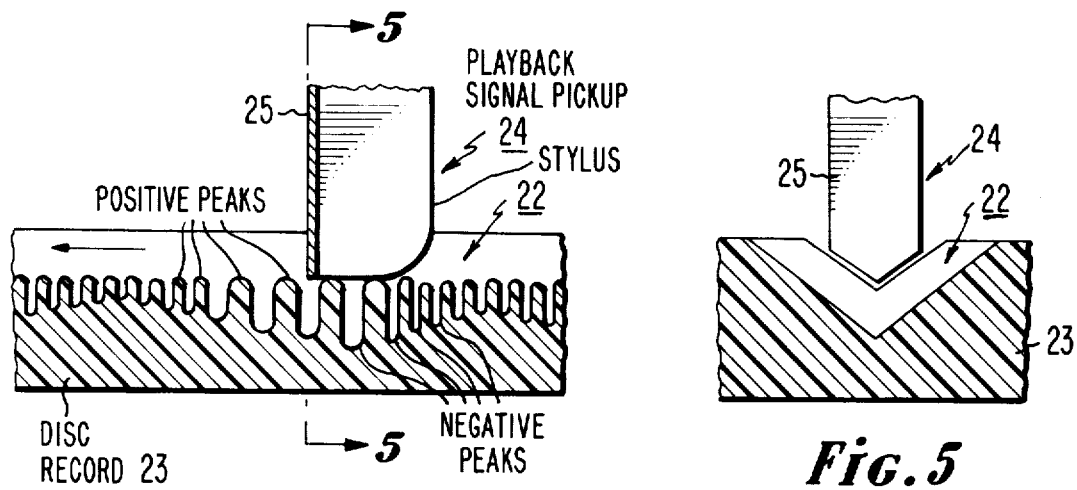
Fig. 4
Fig. 5
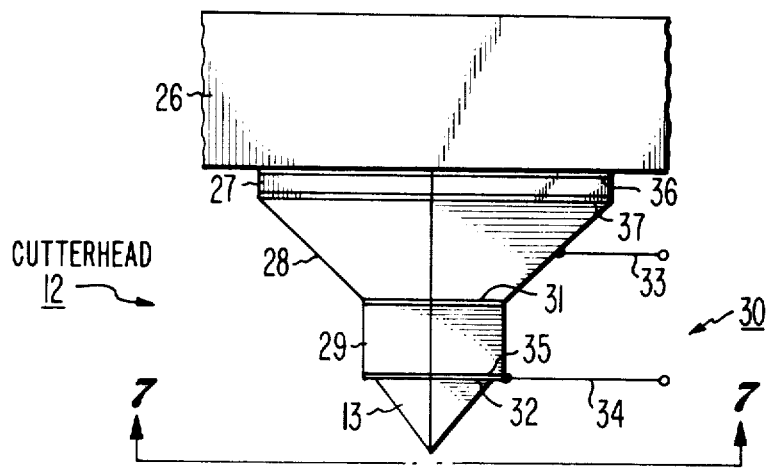
Fig. 6
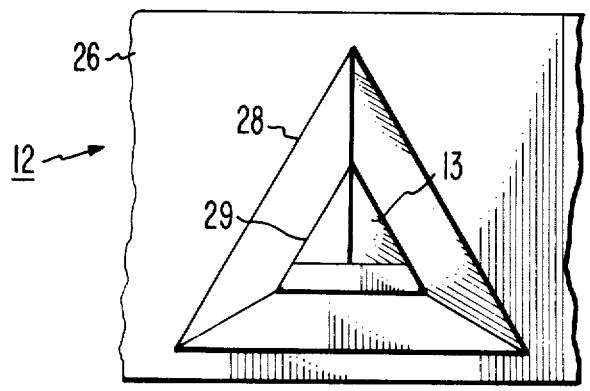
Fig. 7

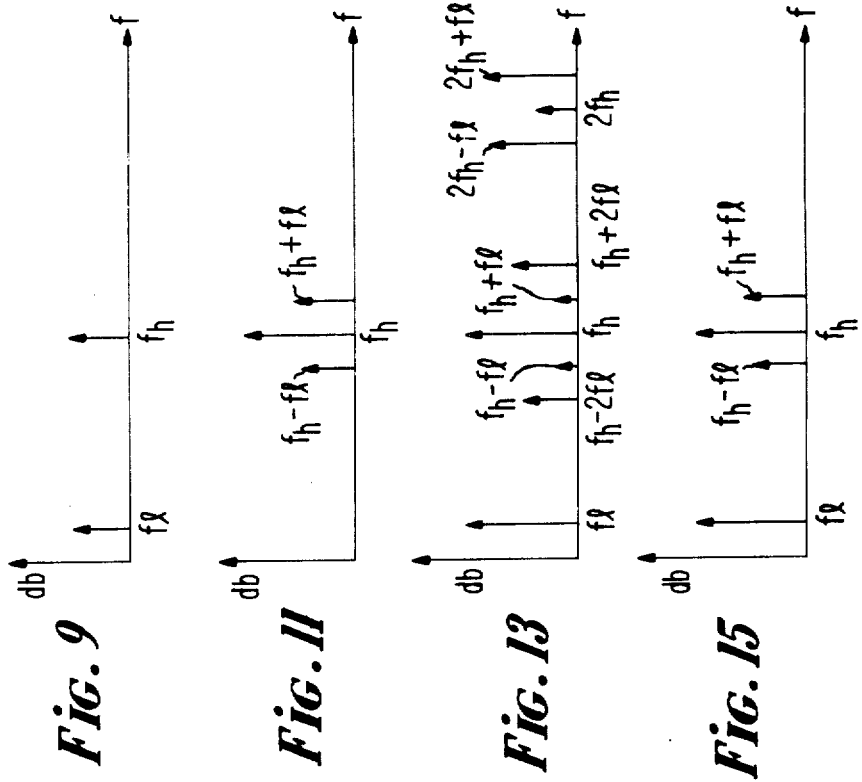
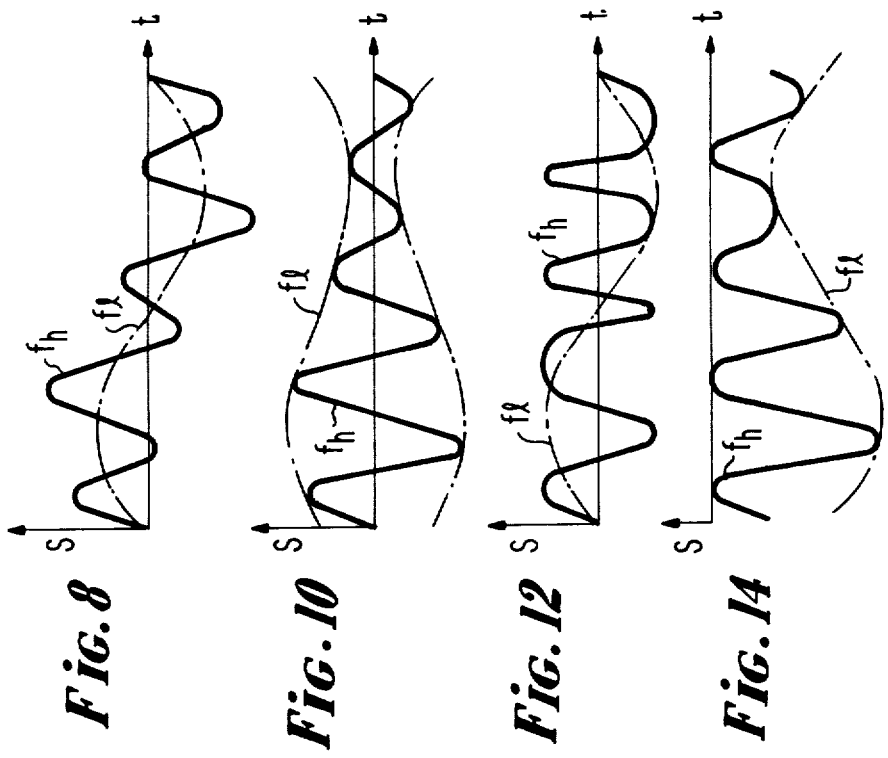

APPARATUS FOR ELECTROMECHANICAL RECORDING OF SHORT WAVELENGTH MODULATION IN A METAL MASTER

This is a division, of application Ser. No. 591,968, filed June 30, 1975.

The present invention relates generally to method and apparatus for recording short wavelength modulation in a master; and, more particularly, concerns electromechanical recording method and apparatus advantageous in the formation of a high density information record, such as a video disc record.

BACKGROUND OF THE INVENTION

In certain high-density information record/playback systems, recorded information appears as an information track constituting relatively short wavelength variation (e.g., 0.6 to 1.6 micrometers) in the geometry of the groove bottom along its length. In one specific but nonlimiting embodiment, this short wavelength variation may encode, for example, a composite color video signal. There are several methods of encoding a composite color video signal in the information track comprising short wavelength variation. Illustratively, the method of encoding may be of the type shown in the copending U.S. Patent Application of E. O. Keizer, Ser. No. 441,069, filed Feb. 11, 1974, entitled, "COLOR PICTURE/SOUND RECORD AND RECORDING/PLAYBACK APPARATUS AND METHODS THEREFOR", and now U.S. Pat. No. 3,911,476. Pursuant to the Keizer method, a first (e.g., video) carrier is frequency modulated over a high frequency deviation range (e.g., of the order of 4.3 to 6.3 MHz) in accordance with a video signal including the luminance and the chrominance of a scanned image. A second carrier is frequency modulated over a low frequency deviation range (e.g., of the order of 716 KHz ± 50 KHz) in accordance with the audio signal accompaniment of the video signal. The once-modulated first carrier is duty cycle modulated in accordance with the once-modulated second carrier. A scanning electron beam apparatus responsive to the twice modulated first carrier records in the groove bottom of a pregrooved master having a coating of photoresist material short wavelength variation representative of the time variation of the recorded signal.

Ordinarily, a stamper (having negative grooves) is obtained from the recorded master (having positive grooves) from which plastic disc records (also having positive grooves) can then be molded. To reconstruct the prerecorded signals, an appropriate relative motion is established between the grooved disc record and a groove-engaging signal pickup responsive to the spatial variation passing underneath. The signal pickup may be of any suitable variety (for example, a capacitance or a pressure type, etc.). Reference may be made to the U.S. Pat. No. 3,842,194, issued to J. K. Clemens, on Oct. 15, 1974, and entitled "INFORMATION RECORDS AND RECORDING/PLAYBACK SYSTEMS THEREFOR", for an illustration of a playback apparatus including a capacitance type of a signal pickup. Pursuant to the Clemens' system, the grooved disc record is provided with a thin deposit of dielectric material overlying a fine coating of conductive material on the base of the disc record (with respective thickness sufficiently small that the dielectric deposit and the conductive coating follow the contours of the groove and the groove bottom variation therein). A playback stylus has a groove-engaging tip incorporating a conductive electrode. The disc record is roatated at an appropriate speed in order to cause variation in the capacitance exhibited between the stylus electrode and the disc record conductive coating in accordance with the signal recorded in the groove bottom. A detector responsive to the capacitance variation reconstructs the prerecorded signal for audio/visual presentation on an ordinary television receiver.

In the above-said type of video disc systems, in order to obtain adequate bandwidth for the signal recovered from the grooved disc record (e.g., 4.3 to 6.3 MHz) during playback (1) the disc record is rotated at a relatively high playback speed (e.g., 450 rpm), and (2) the wavelength of the modulation in the disc record groove is relatively short (e.g., 0.6 to 1.6 micrometers) as compared with conventional audio disc systems.

Since the playback time is (1) directly proportional to the number of grooves per inch in the disc record, and (2) inversely proportional to the playback speed of the disc record, the higher playback speed (e.g., 450 rpm) results in a larger number of grooves per inch in the disc record (e.g., 5,555 gpi) for a given playback time (e.g., 30 minutes from each side). In other words, in the aforesaid type of video disc systems, the groove convolutions are very closely spaced (e.g., 4.5 micrometers) in order to accommodate the information necessary for storing a video program of an acceptable quality and a reasonable playback time. The close spacing of the groove convolutions in the video disc type record (e.g., 4.5 micrometers) results in a groove having a very small quiescent (without groove modulation) depth (e.g., 0.8 micrometer with a groove-apex angle of 140°).

It has been determined from the noise spectra of the recorded master that the noise level in the signal recovered from the grooved disc record during playback is reduced as the wavelength of the noise components measured is reduced. In other words, for given recording level (the peak-to-peak dimension of the groove modulation), the signal-to-noise ratio for a given noise bandwidth improves as the wavelength of the groove modulation due to the recorded signal, and the corresponding noise components, is reduced. With electromechanical recording in a lacquer master, it has been possible to obtain a satisfactory signal-to-noise ratio (e.g., above 40 dB peak-to-peak video/rms noise) with a low recording level (e.g., 0.1 to 0.15 micrometers) when the wavelength of the groove modulation, due to the recorded signal, and the corresponding noise components, is kept relatively short (e.g., 0.6 to 1.6 micrometers). It is desirable to further improve the signal-to-noise ratio for a given recording level; e.g., to accommodate the unavoidable addition of noise during the video disc type record manufacturing operations.

A variety of approaches to disc recording exist in the prior art. For example, electromechanical processes are known in the audio industry for recording groove modulation representative of an audio signal (e.g., having a bandwidth of 20 KHz) in a lacquer master. The following recording parameters are typical in the audio recording processes: (a) the number of grooves per inch — 150 to 350; (b) the groove depth — up to 50 micrometers; (c) the wavelength of the groove modulation — greater than 10 micrometers; and (d) the peak-to-peak dimension of the groove modulation — up to 80 micrometers. Further, the cutting stylus employed for recording audio groove modulation in a lacquer master is heated in order to obtain a satisfactory recording (e.g., a reasonably good signal-to-noise ratio). It has been found that the heated cutting stylus causes the lacquer material to flow while cutting a groove and modulation therein producing a burnishing effect (i.e., surface polish) in the grooves.

A cutterhead for electromechanically recording a video signal in a lacquer master is described in U.S. Pat. No. 3,865,997, issued to J. B. Halter on Feb. 11, 1975, and entitled, "TRIANGULAR PIEZOELECTRIC TRANSDUCER FOR RECORDING VIDEO INFORMATION". In the above-said U.S. Pat. No. (3,865,997), the cutting stylus employed for recording groove modulation in a lacquer master for storing a video signal is also shown heated for satisfactory recording (i.e., reducing the surface noise).

SUMMARY OF THE INVENTION

A method for recording short wavelength modulation in a master by mechanical cutting, pursuant to the present invention, comprises: placing a metal master on a movable support in operating relationship with an unheated cutting stylus in order to effect relative motion between the metal master and the cutting stylus; positioning the cutting stylus with respect to the metal master in order to cut a groove having a quiescent groove depth less than one micrometer while the relative motion is established; vibrating the cutting stylus about the quiescent position thereof in response to a relatively high frequency signal while cutting the groove in order to effect modulation of groove depth in the metal master having a peak-to-peak dimension less than the quiescent groove depth. The electromechanical recording of short wavelength modulation in a metal master without application of heat to the cutting stylus provides superior recording characteristics as compared with other prior art recording technicques.

According to a further feature of the invention, a cutterhead including the cutting stylus suitable for cutting a groove in a metal master having an information track therein comprising short wavelength modulation of groove depth is disclosed. The cutterhead comprises a piezoelectric element rigidly mounted directly between a pedestal and the cutting stylus by means of bonding material. The pedestal, the piezoelectric element, and the cutting stylus are shaped to form a cutterhead structure having all external surfaces disposed antiparallel to each other. Means are provided for energizing the piezoelectric element in accordance with a relatively high frequency signal. The pedestal is mounted in a manner that effects placement of the cutting stylus in operating relationship with the metal master during recording. The cutterhead, pursuant to the principles of the present invention, does not include means for heating the cutting stylus.

BRIEF DESCRIPTION OF THE DRAWINGS

Other objects, features, and advantages of the present invention will be more fully understood from the following detailed description of the preferred embodiment, the appended claims, and accompanying drawings in which:

FIG. 1 illustrates, partly via a simplified block diagram respresentation, a system for electromechanically cutting a groove in a metal master having an information track comprising short wavelength modulation of groove depth pursuant to the principles of the present invention;

FIGS. 2 and 3 illustrate, respectively, a longitudinal-section and a cross-section of a groove cut in the metal master of FIG. 1;

FIGS. 4 and 5 illustrate, respectively, a longitudinal-section and a cross-section of a groove of a disc record manufactured from the recorded metal master of FIGS. 1, 2 and 3.

FIG. 6 illustrates an elevation of a cutterhead suitable for use with the system of FIG. 1;

FIG. 7 illustrates a bottom plan view looking in the direction of line 7—7 of FIG. 6, the electrical connections being removed for clarity;

FIG. 8 illustrates a signal resulting from a superposition of a high frequency (e.g., video) carrier and a low frequency (e.g., audio) carrier;

FIG. 9 illustrates the spectra of the signal of FIG. 8;

FIG. 10 illustrates a signal resulting from an amplitude modulation of a high frequency carrier by a low frequency carrier;

FIG. 11 illustrates the spectra of the signal of FIG. 10;

FIG. 12 illustrates a signal resulting from a duty cycle modulation of a high frequency carrier by a low frequency carrier;

FIG. 13 illustrates the spectra of the signal of FIG. 12;

FIG. 14 illustrates a signal resulting from a negative peak amplitude modulation of a high frequency carrier by a low frequency carrier; and FIG. 15 illustrates the spectra of the signal of FIG. 14.

DETAILED DESCRIPTION OF THE PREFERRED EMBODIMENT

FIG. 1 illustrates a system for electromechanically cutting a groove in a metal master 10 having an information track comprising short wavelength modulation of groove depth. The metal master 10 is placed on a movable support 11 in operating relationship with a cutterhead 12 including a cutting stylus 13 in order to effect relative motion between the metal master and the cutting stylus. The cutting stylus 13 is positioned with respect to the metal master 10 in order to cut a groove 14 having a quiescent groove depth less than one micrometer while the relative motion is established. The cutting stylus 13 is vibrated in response to a relatively high frequency signal (e.g., up to 1.8 MHz) while cutting the groove in order to effect short wavelength modulation (e.g., less than 5 micrometers) of the groove depth having a peak-to-peak dimension less than the groove depth. The electromechanical recording of short wavelength modulation in a metal master provides a high signal-to-noise ratio as compared with other prior art recording techniques.

The formation of the relatively high frequency signal (the time variation of which is represented by the spatial variation in the groove bottom) will now be described with reference to FIG. 1 by way of an example only. Illustratively, a video camera 15 scans the image 16 for developing a video signal at the output thereof. The video signal may include components representative of the luminance and the chrominance of the scanned image 16. The output signal of the video camera 15 is slowed down (e.g., by a factor of 5) by a video slow down processor 39 in order to accommodate the bandwidth of the cutterhead 12. A video modulator 17, coupled to the video slow down processor 39, frequency modulates a slowed-down high frequency carrier over a high frequency deviation range (e.g., of the order of 4.3/5 to 6.3/5 MHz) in accordance with the slowed-down video signal.

A microphone 18 picks up an audio signal accompaniment of the video signal from a speaker 19. The output signal of the microphone 18 is likewise slowed down (e.g., also by a factor of 5) by an audio slow down processor 40 in order to synchronize the audio signal to be recorded with the slowed-down video signal. An audio modulator 20, coupled to the audio slow down processor 40, frequency modulates a slowed-down low frequency carrier over a low frequency deviation range (e.g., of the order of 716/5 ± 50/5 KHz) in accordance with the slowed-down audio signal developed at the output of the microphone 18. An audio/video modulator 21 modulates the once-modulated, slowed-down, high frequency carrier in accordance with the once-modulated, slowed-down, low frequency carrier in a manner described subsequently in conjunction with FIGS. 8 through 15. A relatively high frequency signal at the output of the audio/video modulator 21 (e.g., up to 1.8 MHz) energizes the cutterhead 12 during the recording operation in order to effect short wavelength modulation of groove depth (e.g., 0.6 to 1.6 micrometers) while cutting the groove 14 in the metal master 10 at a slowed-down recording speed (e.g., 450/5 rpm). It is contemplated that refined versions of the cutterhead 12 having relatively wide bandwidths could be developed which would make the real time recording feasible, and thereby eliminating the need for the video slow down processor 39 and the audio slow down processor 40.

Several alternative modes of operation of the audio/video modulator 21 (in other words, several alternative methods of modulating the once-modulated high frequency carrier in accordance with the once-modulated low frequency carrier) will now be explored in conjunction with FIGS. 8 through 15. FIG. 8, 10, 12 and 14 represent, respectively, the signals resulting from (1) a superposition, (2) an amplitude modulation, (3) a duty cycle modulation, and (4) a negative peak amplitude modulation, of a high frequency (e.g., video) carrier by a low frequency (e.g., audio) carrier. In FIGS. 8, 10, 12 and 14, the high frequency carrier and the low frequency carrier are not shown frequency modulated, respectively, by a video signal and an audio signal accompaniment of the video signal for reasons of simplicity and clarity. FIGS. 9, 11, 13 and 15 represent, respectively, the spectra of the signals of FIGS. 8, 10, 12 and 14. In FIGS. 8 through 15, $f_h$ represents the high frequency carrier, while $f_l$ represents the low frequency carrier. As previously indicated, the signal at the output of the audio/video modulator 21 energizes the recording apparatus during the recording operation in order to effect a short wavelength modulation of groove depth.

As can be seen from FIGS. 9, 11, 13 and 15, the duty cycle modulation of FIG. 13 requires the most bandwidth for the recording apparatus ($2f_h + f_l$) in order to satisfactorily record the signal. As illustrated in FIGS. 8, 10, 12 and 14; (a) the superposition signal of FIG. 8, (b) the amplitude modulated signal of FIG. 10, and (c) the negative peak amplitude modulated signal of FIG. 14, require a reasonably good amplitude linearity for the recording apparatus in order to satisfactorily record the signal in contrast to the duty cycle modulated signal of FIG. 12 having a constant peak amplitude.

On the one hand, the previously indicated scanning electron beam recording apparatus is inherently capable of a broad bandwidth (e.g., 12.6 MHz) typically required for satisfactory recording of video type signals. Therefore, the scanning electron beam recording apparatus is more suitable for recording signals obtained by duty cycle modulation (e.g., FIG. 12). ON the other hand, the electromechanical recording apparatus is capable of a good amplitude linearity over the range of recording levels (i.e., the cutting stylus 13 displacement) ordinarily encountered in video signal type recording (i.e., up to 1 micrometer). Thus, the electromechanical recording apparatus is more suitable for recording signals obtained by (1) the superposition method (e.g., FIG. 8), (2) the amplitude modulation method (e.g., FIG. 10), and (3) the negative peak amplitude modulation method (e.g., FIG. 14).

Since the positive peaks of the signals illustrated in FIGS. 8 and 10 do not lie along a line parallel to the abscissa, and since the length of the playback stylus shoe is ordinarily less than the wavelength of the low frequency (e.g., audio) carrier, the playback stylus undergoes a vertical motion during playback of the recordings of the signals of FIGS. 8 and 10 at the low frequency carrier rate. However, since the positive peaks of the signals illustrated in FIGS. 12 and 14 lie along a line parallel to the abscissa, and since the length of the playback stylus shoe is normally slightly greater than the longest wavelength of the high frequency (e.g., video) carrier, the playback stylus does not undergo a vertical motion during playback of the recordings of the signals of FIGS. 12 and 14 at the either frequency carrier rate. The vertical motion of the playback stylus during playback is undesirable for several reasons. First, the vertical motion greatly increases the wear of the playback stylus and the record medium. Second, the playback stylus may have a tendency to lose contact with the recording medium causing a signal dropout at the output of the signal pickup during playback. Although the playback stylus may be urged to remain in contact with the record medium during playback by increasing the stylus/medium contact pressure, the increase in contact pressure will result in additional wear of the playback stylus and the record medium. Third, the vertical motion of the playback stylus during playback results in variation in the spacing between the stylus electrode and the short wavelength groove modulation due to the high frequency carrier at the low frequency carrier rate. The variation in the spacing of the stylus electrode is undesirable because it varies the sensitivity and resolution capability of the signal pickup, thereby distorting the signal at the output of the pickup at the low frequency carrier rate.

The signal obtained by the duty cycle modulation (e.g., FIG. 12) may be less desirable for the electromechanical recording apparatus because the duty cycle modulation signal requires the most bandwidth (e.g., $2f_h + f_l$) for the cutter head 12. When the bandwidth of the electromechanical recording apparatus is increased, it is more desirable to increase the recording speed rather than consume the additional bandwidth to encode the low frequency (e.g., sound) carrier on the high frequency (e.g., video) carrier. Thus, it is noted that the negative peak amplitude modulation method (e.g., FIG. 14) is suitable both from the recording and the playback viewpoints.

In the previously described specific but non-limiting embodiment, the innermost diameter required for a thirty minute playing time from a 12 inch disc record, having 5,555 grooves per inch and rotating at 450 rpm, is approximately 6.6 inches. The shortest wavelength of approximately 0.6 micrometer is cut at the innermost diameter of approximately 6.6 inches while recording the highest signal frequency of 6.3 MHz at the recording speed of 450 rpm. It has been found that for a recorded wavelength of 0.6 micrometer, a peak-to-peak groove modulation of 0.1 micrometer (i.e., approximately 4 microinches) will provide an adequate signal-to-noise ratio. For example, a 60 dB signal-to-noise ratio was obtained for a 30 KHz noise bandwidth with a peak-to-peak groove modulation of 0.1 micrometer at 0.6 micrometer wavelength by using the presently disclosed electromechanical recording of short wavelength modulation in a metal master technique. This would translate into a 40 dB (rms signal/rms noise) signal-to-noise ratio for a 3.0 MHz bandwidth for the amplitude modulation type recording of a video signal. Refer to the U.S. Pat. No. 3,842,194 for an example of the amplitude modulation type recording of a video signal. In the case of the abovesaid frequency modulation type recording of a video signal, this would translate into a 56 dB signal-to-noise ratio (peak-to-peak video/rms noise) for a 3.0 MHz bandwidth. Refer to the U.S. patent application Ser. No. 441,069 for an example of the frequency modulation type recording of a video signal. It is noted that these signal-to-noise ratios have not been obtained by the electromechanical recording in a lacquer master technique at the same recording levels.

Further, a groove modulation having a peak-to-peak dimension of 0.1 micrometer (approximately 4 microinches) and a wavelength of 0.6 micrometer will have a maximum slope at its zero crossing which can be computed as follows:

$$\text{slope (degrees)} = \text{Arctan}\left[\frac{\text{maximum stylus velocity}}{\text{minimum groove velocity}}\right]$$

$$= \text{Arctan}\left[\frac{(2\pi)(6.3 \times 10^6)(2 \times 10^{-8})}{(2\pi)(7.5)(3.3)}\right]$$

$$= 28 \text{ degrees, approximately.}$$

The trailing edge of the cutting stylus 13 must have a slope greater than 28° in order to avoid interference with the previously recorded groove modulation in the region of the maximum slope at the innermost diameter of approximately 6.6 inches while recording the highest signal frequency of 6.3 MHz at the recording speed of 450 rpm.

Reference will now be made to FIGS. 2 and 3. FIGS. 2 and 3 illustrate, respectively, a longitudinal-section (i.e., along the groove) and a cross-section (i.e., perpendicular to the groove) of the groove 14 cut in the metal master 10 by the cutting stylus 13. The included angle B of the cutting stylus 13 is the angle subtended between the cutting edges of the stylus. The clearance angle A of the cutting stylus 13 is the angle subtended by the trailing edge of the cutting stylus with the line of motion of the metal master 10. It has been found that it is more difficult to grind flaw-free cutting edges (when viewed under a magnification power of 10,000) as the clearance angle increases. The present diamond grinding technology permits grinding of flaw-free cutting edges with the clearance angle of up to 40°. The stylus clearance angle of 40° has been found to cut adequate peak-to-peak groove modulation (e.g., 0.1 micrometer) at a short wavelength (e.g., 0.6 micrometer) in order to provide a satisfactory signal-to-noise ratio when the presently disclosed electromechanical recording of a short wavelength modulation in a metal master technique is used.

The metal master 10 may be comprised of a thin deposit of a metal having a homogeneous and fine grain (e.g., nearly a single crystalline type) structure (e.g., copper) on a substrate disc (e.g., aluminum). Alternately, the metal master 10 could be a solid disc of a metal having a homogeneous and fine grain structure. In the preferred embodiment, a thin deposit of copper is electroplated on an aluminum substrate disc. The copper deposit is then faced off to make the surface to be recorded relatively flat. Materials having properties which can be processed to have a very fine (e.g., nearly a single crystalline type) crystalline structure (e.g., copper, speculum, certain aluminum alloys) are suitable for recording in metal.

Typically, a stamper (having negative grooves) is obtained by electroplating process from the recorded master 10 (having positive grooves). Plastic disc records (also having positive grooves) can then be molded from the stamper by a suitable compression or injection molding process. FIGS. 4 and 5 illustrate, respectively, a longitudinal-section and a cross-section of a groove 22 of a disc record 23 manufactured from the recorded metal master 10. To reconstruct the prerecorded signal, an appropriate relative motion is established between the grooved disc record 23 and a signal pickup 24 which is responsive to the spatial variation passing underneath. In the capacitance type signal pickup, the grooved disc record 23 is provided with a thin dielectric deposit (not shown) overlying a fine conductive coating (not shown) on the base of the disc record. The signal pickup 24 rides smoothly in the groove 22 during playback on the top of the positive peaks which are substantially aligned along a surface parallel to the line of motion of the disc record 23. The signal pickup 24 has a groove engaging tip incorporating a conductive electrode 25 having an exposed edge with an effective dimension along the groove 22 not exceeding one-half of the wavelength of modulation recorded in the groove 22 of the disc record 23 in order to obtain sufficient recorded signal resolution capability. The disc record 23 is rotated at an appropriate speed in order to cause variation in the capacitance between the electrode 25 and the conductive coating of the disc record 23 in accordance with the signal recorded in the groove 22 bottom. A detector (not shown) responsive to the capacitance variation reconstructs the prerecorded signal.

FIGS. 6 and 7 illustrate, respectively, an elevation and a bottom view of the cutterhead 12 suitable for cutting a groove in the metal master 10 having an information track comprising short wavelength modulation of groove depth. The cutterhead 12 includes a support 26, damping members 27, 36 and 37, a pedestal 28, a piezoelectric element 29, a piezoelectric energizing means 30, and the cutting stylus 13. The piezoelectric element 29 is rigidly mounted directly between the pedestal 28 and the cutting stylus 13 by means of bonding materials 31 (e.g., conductive) and 32 (e.g., nonconductive). The pedestal 28, the piezoelectric element 29, and the cutting stylus 13 are shaped to form a cutterhead structure having all external surfaces disposed antiparallel to each other. To ensure a good bond strength between the piezoelectric element 29 and the cutting stylus 13, a non-conductive epoxy bond 32 is provided at the interface. The cutting stylus 13 may preferably be made from diamond material for obtaining relatively flaw-free cutting edges and optimum dynamic properties (since it has the highest Young's modulus of the known materials) while providing a reasonable life for the cutting stylus.

In order to apply the electrical signal representative of the high frequency signal to be recorded to the piezoelectric element 29, in this particular embodiment, (a) the pedestal 28, and (b) the bonding material 31 interposed between the adjacent surfaces of the piezoelectric element and the pedestal, are made of conductive materials. A first wire 33 is electrically coupled to the conductive pedestal 28. A second wire 34 is electrically coupled to a fillet 35 of conductive material secured to the metalized surface (e.g., silver coated) of the piezoelectric element 29 adjacent to the cutting stylus 13.

The piezoelectric element 29 is responsive to the electrical signal to be recorded such that the vertical displacement of the cutting stylus 13 is in the same direction as the applied electrical field. The piezoelectric element 29 has sides approximately triangular shaped in cross-section conforming with the shape of the pedestal 28 upon which it is mounted. For a given largest linear dimension within the moving portion of the cutterhead 12, a triangular cross-section will provide a highest major resonant frequency of the various, simple, geometrical shapes which are most feasible to fabricate. While other cross-sections (such as circular, trapezoidal, etc.) could provide a satisfactory frequency response characteristic, a triangular cross-section is preferred because it provides a superior frequency response characteristic. Although the piezoelectric element 29 is illustrated with vertical sides (i.e., perpendicular to the line of motion of the metal master 10) in FIG. 6, the sides of the piezoelectric element may preferably be beveled to form a triangular truncated pyramidal structure similar in shape to the pedestal 28. Further, the general triangular pyramidal structure of the cutterhead 12 provides stiffness in the horizontal plane in order to prevent lateral resonances below the major vertical resonance of the cutterhead. Typical piezoelectric materials which are suitable for the piezoelectric element 29 are of lead zirconium titanate type, and are available from the Clevite Corporation as PZT-4 or PZT-8 materials.

The damping is provided to the cutterhead 12 by a member 27 (made of relatively rigid material) and the bonding materials 36 and 37 (made of relatively pliable material). Alternatively, the damping structure may include additional thin layers of pliable material separated by layers of more rigid material. The thin layers of pliable material may be of the silicon rubber or the cellulose of the type manufactured by the American Viscose Company, Markus Hook, Pennsylvania, under the name Viscoloid. The more rigid material may be made from Kapton available from the Dupont Corporation. The compliance of the members 27, 36 and 37 interposed between the pedestal 28 and the support 26 attenuates, and, therefore inhibits reflection of the propagating waves generated by the piezoelectric element 29 within the pedestal 28. The members 27, 36 and 37 also decouple the moving portion of the cutterhead 12 from the resonant modes within the support 26 and other parts of the cutterhead suspension and the recording apparatus. The support 26 is desirably made of material having a high stiffness (e.g., aluminum or steel) in order to provide a proper termination for the damping elements 27, 36 and 37.

In order to obtain a greater displacement of the cutting stylus 13 for a given level of energization of the piezoelectric element 29, it is desirable to maintain the surface of the piezoelectric element which is remote from the cutting stylus as stationary as possible, allowing the surface of the piezoelectric element which is adjacent to the cutting stylus to provide essentially all the displacement. In order to maintain the remote surface of the piezoelectrice element 29 as stationary as possible, the pedestal 28 should present a relatively large mechanical impedance to the motion of the piezoelectric element. Since the mechanical impedance of a material is proportional to the square root of the product of the density ($\rho$) of the material and the Young's modulus (E) (Z = square root of $\rho \times E$), it is desirable to use a material having a relatively high density and a high Young's modulus for the pedestal 28. It has been determined that steel and tungsten are suitable materials for the pedestal 28. Although tungsten gives a slightly greater bandwidth, it is relatively difficult to work with. Steel provides a satisfactory compromise between the cutterhead bandwidth requirement and the workability. Other comparable materials may satisfactorily fulfill the above-said requirements.

As can be seen from FIGS. 6 and 7, all external surfaces of the assembled cutterhead 12 are disposed antiparallel to each other in order to eliminate parallel transmission paths for the propagating waves between opposite external surfaces during recording. It has been found that the parallel transmission paths of the propagating waves increase the magnitude of the resonances (i.e., the Q parameter of the cutterhead). These resonances are detrimental to the performance of the cutterhead 12 as a substantially uniform frequency response characteristic for the cutterhead is desirable.

It is noted that, ideally, the motion of the cutting stylus 13 should only be perpendicular (e.g., vertical) to the motion of the metal master 10 being recorded (e.g., horizontal) in order to prevent undesirable distortion of the signal recorded in the master. In practice, some horizontal motion of the cutting stylus 13 tip may be tolerated provided that the horizontal motion remains relatively small and nearly proportional to the vertical motion of the stylus tip (e.g., one-fifth) throughout the usable bandwidth of the cutterhead 12. In the case of an FM encoded video signal, slight waveform distortion of the signal recorded in the metal master 10 may be tolerated. However, timing errors caused by a variation in the relative horizontal motion, especially, in the longitudinal groove direction, with a change in the frequency of the recorded signal can cause problems (e.g., echos and ghosts in the reproduced picture).

It has been determined that a cutterhead having a horizontal cross-section which is an equilateral triangle has external surfaces which are anti-parallel providing a relatively smooth frequency response characteristic; and, in addition, has a horizontal symmetry which is beneficial in reducing the horizontal motion of the cutting stylus 13 tip. The horizontal motion of the stylus tip can be reduced by approximately positioning the stylus tip under the centroid of the piezoelectric element 29 when the cutterhead 12 is in the operative position. As can be seen from FIGS. 6 and 7, the altitude of the triangular surface of the cutting stylus 13 which is adjacent to the piezoelectric element 29 is less than the altitude of the adjacent piezoelectric element surface. The altitude of the adjacent triangular surface of the cutting stylus 13 is generally made slightly larger than two-thirds of the altitude of the adjacent surface of the piezoelectric element 29 so that the stylus tip is positioned just forward of the centroid of the piezoelectric element in the longitudinal groove direction. The forward positioning of the stylus tip compensates for the stiffness and mass loading effects of the cutting stylus 13 on the piezoelectric element 29 which tends to shift the zero-horizontal-motion point in the same forward direction from the centroid of the piezoelectric element. Alternately, the stylus tip can be positioned substantially under the centroid of the truncated pyramidal piezoelectric element 29 and additional loading (not shown) can be added to the remaining portion of the adjacent piezoelectric element surface in order to improve the balance of the load on the piezoelectric element. Where additional loading is provided for balancing the load on the piezoelectric element 29, adequate clearance should be provided for removal of the metal chip.

The design of the cutterhead 12 is such that the frequency response is uniform to very low frequencies (e.g., audio frequencies), although the cutterhead is normally operated in the upper portion of its useful bandwidth over a range of about 1.3 decades (i.e., 9.3 MHz/0.716 MHz). The cutterhead operates in the fixed-free mode at the low frequencies, i.e., the surface of the pedestal 28 adjacent to the damping members 27, 36 and 37 is relatively fixed. As the frequency of the signal which energizes the cutterhead 12 increases into the midband region, the mode of cutterhead vibration shift from the fixed-free mode to a pseudo free-free mode or terminated-free mode of vibration, i.e., the surface of the pedestal 28 adjacent to the damping members 27, 36 and 37 vibrates. The displacement of the stylus tip for a given energization signal is not reduced appreciably as the cutterhead 12 shifts from the fixed-free mode to the pseudo free-mode of vibration. The pyramidal shape of the cutterhead 12 is helpful in providing a nearly uniform stylus tip displacement for a given energization signal in the midband and upper frequency band regions because the center of gravity of the cutterhead is relatively close to the surface of the pedestal 28 adjacent to the damping members 27, 36 and 37. The cutterhead 12 is geometrically proportioned and damped in order to reduce irregularities in the frequency response characteristic in the frequency range where the transition from the fixed-free mode to the pseudo free-free mode of vibration of the cutterhead occurs.

As previously indicated, the recording styli employed for cutting groove modulation in a lacquer master for recording an audio or a video signal must be heated in order to obtain a sufficient signal-to-noise ratio during playback (i.e., in order to obtain a proper groove surface finish for reducing the surface noise). For example, refer to the U.S. Pat. No. 3,865,997, issued to J. B. Halter on Feb. 11, 1975, and entitled, "TRIANGULAR PIEZOELECTRIC TRANSDUCER FOR RECORDING VIDEO INFORMATION".

Pursuant to the principles of the present invention, the cutting stylus 13 cuts short wavelength groove modulation (e.g., 0.6 to 1.6 micrometers) in the metal master 10 in a manner that provides a superior signal-to-noise ratio even though the cutting stylus is not heated. As the cutting stylus 13 satisfactorily records in the metal master 10 without heating, means for heating the cutting stylus is not included in the cutterhead 12. Elimination of the heating means from the cutterhead 12 is a major breakthrough in the art of video type signal recording for the following reasons.

First, it results in an increase in the bandwidth of the cutterhead 12 (e. g., approximately 1.8 MHz) which makes it possible to record short wavelength groove modulation (e.g., 0.6 to 1.6 micrometers) in the metal master 10 at relatively high recording speeds (e.g., 450/5 rpm). It may even open the door to real time electromechanical recording (e.g., at 450 rpm) of video type signals. In order to satisfactorily record a high frequency carrier (e.g., 4.3 to 6.3 MHz) modulated by a broadband video signal (e.g., at rates up to 3 MHz) in real time, the cutterhead 12 must have a fairly flat frequency response characteristic extending to at least the highest first order sideband frequency (e.g., 9.3 MHz) of the highest instantaneous frequency of the carrier (e.g., 6.3 MHz). If, for example, the bandwidth of the cutterhead is one-fifth the highest first order sideband frequency of the carrier, the recording time would be five times the time required for the real time recording of the modulated high frequency carrier, and so on. This is so because the modulated high frequency carrier, and therefore the recording speed, would have to be slowed down by a factor of five (referred to commonly as five-times-down recording). Since the longer recording times are inconvenient, impractical, and costly, it is beneficial to reduce the recording time by increasing the bandwidth of the cutterhead 12.

The bandwidth of the cutterhead 12 is limited by its major resonant frequency. As the major resonant frequency of the cutterhead 12 is increased by a reduction in the mass of the moving portion of the cutterhead (particularly near the stylus tip), the elimination of the heating means from the cutterhead reduces the mass of the cutterhead and, therefore, extends the cutterhead bandwidth.

Of a greater importance is the elimination of the space required for the heating means on the cutting stylus 13 because it results in a smaller and lighter weight cutting stylus, whereby the cutterhead 12 bandwidth is further extended.

Additionally, the elimination of the heating means from the cutterhead 12 means that the cutting stylus can be directly mounted on the piezoelectric element 29, thereby eliminating the stylus mount (for example, of the type shown in the U.S. Pat. No. 3,865,997) from the cutterhead. The elimination of the stylus mount from the cutterhead 12 reduces the mass thereof, whereby the cutterhead bandwidth is still further increased.

Second, the elimination of the heating means from the cutterhead 12 simplifies the assembly, and reduces the cost of the cutterhead. Further, the elimination of the heating means from the cutterhead 12 makes the construction of small cutterheads feasible and more practical.

Third, the higher temperature (e.g., approximately 350° F) employed with a heated cutting stylus weakens the epoxy bond between the piezoelectric element and the cutting stylus, thereby reducing the signal level which can be recorded. Further, the weakening of such bond reduces the Young's modulus thereof, thereby impairing the frequency response characteristic of the cutterhead in the region of the higher frequencies of the recorded signal. Therefore, the elimination of the heating means from the cutterhead 12 improves the signal handling capability, and extends the frequency response characteristic of the cutterhead.

Fourth, a higher temperature (e.g., approximately 350° F) at the cutting stylus 13 is accompanied by a higher operating temperature for the piezoelectric element 29 which increases the runaway problem due to the self-heating of the piezoelectric element. Therefore, the piezoelectric element 29 drive level must be reduced in the region of the higher frequencies of the recorded signal. Thus, the elimination of the heating means from the cutterhead 12 permits use of the higher piezoelectric element drive levels.

Fifth, a higher temperature (e.g., approximately 350° F) at the cutting stylus 13 is also accompanied by a higher temperature of the damping structure (27, 36 and 37), thereby reducing its mechanical resistance. The reduction of the damping resistance is undesirable because the reduction causes the frequency response characteristic curve to be less uniform, and the peaks and dips of the curve to be more pronounced. Therefore, the elimination of the heating means from the cutterhead 12 provides a more uniform frequency response characteristic for the cutterhead.

Sixth, a hot cutting stylus will occasionally melt or burn the chips generated by the cutting of a groove in a lacquer master; especially, if the chips break and momentarily stay in proximity with the hot cutting stylus. This is undesirable as a hard residue may form on the cutting stylus close to its cutting edges which may impair the groove surface finish, thereby reducing the signal-to-noise ratio of the recording in the lacquer master.

Seventh, a lower operating temperature of the cutterhead 12 due to the elimination of the heating means therefrom extends the life of the cutterhead.

Further, a method for electromechanically cutting short wavelength modulation (e.g., 0.6 to 1.6 micrometers) in a metal master, pursuant to the principles of the present invention, can present many improvements in the quality of recording as compared with recording in other media (e.g., lacquer master, photoresist) in addition to the improvements stated above.

One, the recording loss may be defined, for the present purposes, as a ratio of the peak-to-peak groove modulation (e.g., P in FIG. 2) to the peak-to-peak displacement of the cutting stylus 13 used for effecting the groove modulation. The recording loss in cutting short wavelength modulation (e.g., 0.6 to 1.6 micrometers) in a metal master is lower than that obtained in a lacquer master. For example, the recording loss is of the order of one dB in the metal master at 0.6 micrometer groove modulation wavelength which is approximately 7 dB lower than that obtained in the lacquer master. The recording loss in the metal master, vis-a-vis the lacquer master, is relatively low because of the lack of springiness (non-compliant behavior) of the metal master. It is believed that the electromechanical recording of short wavelength modulation in a metal master produces less recording loss at short wavelengths (e.g., 0.6 to 1.6 micrometers) than any other presently available recording technique (e.g., lacquer master, magnetic tape, laser beam recording, electron beam recording). Since the electronic equalization of the recording for uniform response at the shorter wavelengths requires either a reduction in the recording level at the longer wavelengths or an increase in the recording level at the shorter wavelengths, the reduction of the recording loss at the shorter wavelengths extends the usable bandwidth, and/or increases the signal handling capability of the recording apparatus.

Two, a stamper (having negative grooves) could be directly generated by electroplating process from the recorded metal master (having positive grooves). Plastic disc records (having positive grooves) can then be molded from the stamper by a suitable compression or injection molding process. However, two more generations of negative and positive matrices ordinarily intervene between the recorded master and the stamper used for pressing disc records in order to produce a sufficient number of stampers required for mass production of the disc records. Many more negative matrices (e.g., 20 to 40) can be made from a metal master vis-a-vis a lacquer master or an electron beam recording in a photoresist.

Three, the surface noise in cutting short wavelength modulation (e.g., 0.6 to 1.6 micrometers) in a metal master is lower than obtained in a lacquer master. The reduction in the surface noise in the metal master as compared with the lacquer master is believed to be due to a more homogenous composition and a more fine effective grain structure (e.g., a near single crystalline type) presented by the metal master vis-a-vis the lacquer master. The finer effective grain structure assures a reduction in the surface noise of the recording in a metal master relative to that obtained in a lacquer master, especially, in the region of the short wavelengths of the recorded signal. The reduction in the surface noise means that either the recording level may be reduced for a given signal-to-noise ratio or the signal-to-noise ratio may be improved for a given recording level. A reduction of the recording level means that smaller cutterheads having wider bandwidths are feasible. The wider bandwidths make possible higher recording speeds. Materials which can be processed to have a very fine (e.g., a near single crystalline) structure (e.g., copper, speculum, certain aluminum alloys, etc.) are suitable for recording short wavelength modulation in metal.

Four, the system for electromechanically recording short wavelength modulation in a metal master presents certain processing advantages in terms of time and cost as compared with the electromechanical recording in a lacquer master. For example, in order to generate a stamper from a recorded lacquer master by the commonly employed electroplating process, the recorded surface of the lacquer, being non-conductive, must be metalized (e.g., silvering operation) in order to make it conductive to initiate the electroplating process. The metalizing operation is not required when the recording is made directly in a metal master.

Five, the system for electromechanically recording directly in a metal master also presents certain advantages in terms of time and cost as compared with an apparatus for electron beam recording on a photoresist deposit overlying a pregrooved master. Basically in the electron beam apparatus, the master is pregrooved, coated with a photoresist deposit which is exposed by an electron beam in accordance with a signal to be recorded, the exposed photoresist is removed, (e.g., dissolved), and the recorded surface is metalized in order to generate a stamper, etc. Additionally, the operations involving the photoresist material are done under a special lighting (which does not affect the photoresist material), and a class 100 clean room is desirable for the electron beam apparatus. These operations and requirements do not exist in the electromechanical recording in a metal master method.

The success of electromechanical recording short wavelength modulation (e.g., 0.6 to 1.6 micrometers) in a metal master depends upon a combination of several factors; among these are (1) quiescent groove depth (i.e., without modulation) of less than one micrometer, and (2) peak-to-peak groove modulation of less than the groove depth. The groove depth and the peak-to-peak groove modulation dimensions are of importance since (1) the force (or power) required in cutting a groove is proportional to the amount of material cut (removed) from the groove, (2) the amount of the material removed from the groove is proportional to the cross-sectional area of the groove, and (3) the cross-sectional sectional area of the groove is proportional to the square of the depth of the groove for a given included angle at the apex of the groove. In other words, the force required in cutting a groove is proportional to at least the second power of the groove depth. Because of the very small size of the groove and modulation necessary for proper recording characteristics, the force required in cutting a groove in a metal master is limited to a relatively small magnitude. The reduction in the force reduces the stress on the cutting edges of the stylus, whereby the metal cutting technique is made feasible and practical since the life of the cutting stylus is considerably extended. The recording of short wavelength modulation in very shallow grooves in a metal master gives excellent recording characteristics.

It will be understood that the above description of the preferred embodiment is susceptible to various modifications, changes, and adaptations; and the same are intended to be comprehended within the meaning and range of equivalents of the appended claims.

What is claimed is:

1. A cutterhead for cutting a groove in a metal master having an information track constituting short wavelength modulation of groove depth comprising:
   1. a pedestal;
   2. an unheated cutting stylus;
   3. a piezoelectric element rigidly mounted directly between the pedestal and the cutting stylus by means of bonding materials forming a structure having all external surfaces disposed anti-parallel to each other;
   4. means for energizing the piezoelectric element in accordance with a relatively high frequency signal in order to effect short wavelength modulation of groove depth in the metal master wherein the quiescent groove depth and the peak-to-peak dimension of the groove modulation are less than one micrometer; and
   5. means for mounting the pedestal in a manner that effects placement of the cutting stylus in operating relationship with the metal master during recording.

2. A cutterhead as defined in claim 1 wherein the pedestal is made of material having a relatively high Young's modulus and a relatively high density.

3. A cutterhead as defined in claim 2 wherein the material for the pedestal is selected from a group of materials consisting of steel and tungsten.

4. A cutterhead as defined in claim 1 wherein the pedestal is truncated triangular pyramid, wherein the piezoelectric element is triangular in cross-section, and wherein the pyramidal shape is beveled toward the cutting stylus from the mounting means.

5. A cutterhead as defined in claim 4 wherein cross-sections of the pedestal and the piezoelectric element are equilateral triangles.

6. A cutterhead as defined in claim 5 wherein the piezoelectric element is a truncated pyramid beveled toward the cutting stylus.

7. A cutterhead as defined in claim 1 wherein the pedestal and the piezoelectric element are truncated conicals, and wherein the conical shapes are tapered toward the cutting stylus.

8. A cutterhead as defined in claim 1 wherein the pedestal and the bonding material interposed between the adjacent surfaces of the piezoelectric element and the pedestal are made of conductive materials, and wherein the means for energizing the piezoelectric element comprise:
   a first wire electrically coupled to the conductive pedestal; and
   a second wire electrically coupled to a fillet of conductive bonding material secured to the metalized surface of the piezoelectric element adjacent to the cutting stylus.

9. A cutterhead as defined in claim 1 wherein the mounting means includes damping material interposed between the second surface of the pedestal and the remaining portion of the mounting means.

10. A cutterhead as defined in claim 1 wherein the tip of the cutting stylus is positioned substantially in-line with the centroid of the horizontal cross-section of the piezoelectric element in order to reduce the undesirable motion of the stylus tip in the horizontal plane.

11. A cutterhead as defined in claim 1 wherein the pedestal, the piezoelectric element, and the cutting stylus are shaped to form a cutterhead structure having all external surfaces disposed anti-parallel to each other.

* * * * *